June 14, 1932.  R. FUNKE  1,862,955
DRILL FOR DENTAL PURPOSES
Filed Feb. 20, 1930
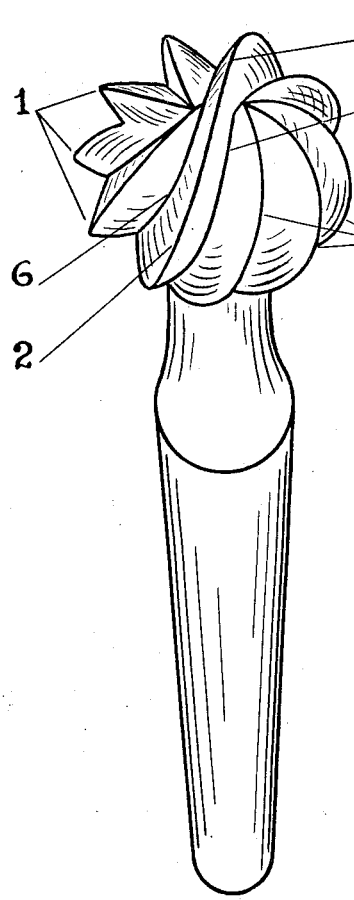
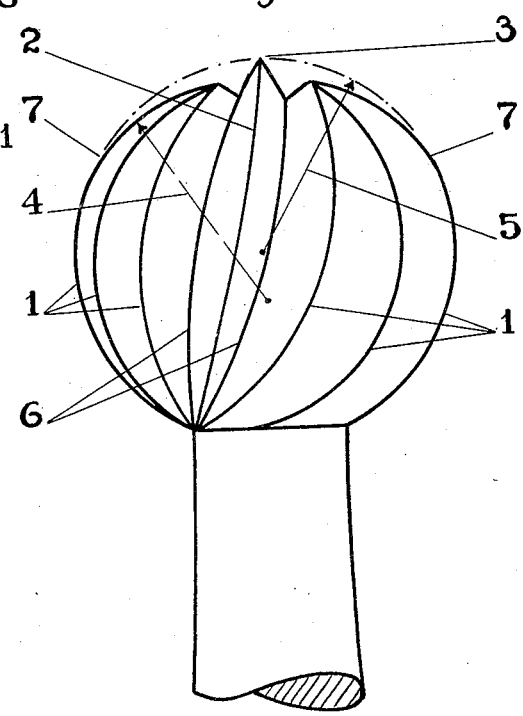
Rudolf Funke, by:
B. Singer, atty.

Patented June 14, 1932

1,862,955

UNITED STATES PATENT OFFICE

RUDOLF FUNKE, OF DUSSELDORF, GERMANY

DRILL FOR DENTAL PURPOSES

Application filed February 20, 1930, Serial No. 430,024, and in Germany November 5, 1929.

The invention relates to dental drills which are provided with a plurality of cutting edges distributed upon the periphery of the drill, two of which cutting edges are formed in one continuous drilling edge passing over the crown of the drill. As with such drills all the cutting edges are simultaneously in operation a comparatively great feed pressure is acquired when boring in axial direction. This drawback is obviated with the ordinary two-edged drills, which, however, owing to the absence of guide teeth, jump and rattle upon the hard tooth substance.

According to the invention the advantages of the types of drills referred to are combined by arranging the said continuous drilling edge to project in axial direction relatively to the remaining guide teeth. It therefore acts in the manner of an ordinary two-edged drill while boring axially, jumping of the drill being prevented by the guide teeth. Further there is the advantage that the drill formed in the novel manner according to the invention may be used at an angle to the drill axis in the manner of a milling tool.

On the drawing is shown by way of example one form of the new drill.

Fig. 1 shows a perspective representation.

Fig. 2 is a side elevation.

The drawing illustrates a drill with spherical head the cutting teeth 1 of which are uniformly distributed upon the periphery of the drill. Two edges 2 are formed in one continuous drilling edge 3 passing over the crown of the drill.

As shown particularly in Fig. 2 the edge 3 projects relatively to the edges 1 in axial direction, this being attained for example by placing the centre of the radius 4 of the crown portion of the edges 1 eccentrically towards the shank of the drill in respect of the centre of the radius 5 of the cutting edges 3. Contrariwise the cutting edge 3 may project beyond the spherical form of the drill head. The flutes 6, one at each side of the continuous drilling edge 3, serving for the removal of chips are somewhat larger than the remaining flutes, so that they are better adapted for the removal of chips thus preventing choking of the adjacent teeth. Beyond the point 7 all cutting edges are equidistant from the centre of the drill, in consequence whereof the drill may be used at an angle to the drill axis for milling purposes.

I claim:

A dental drill having a substantially spherical head provided with a continuous drilling edge the center of the radius of which is coincident with that of the head and also having cutting edges at opposite sides of said continuous drilling edge, the center of the radius of said cutting edges on the crown portion of the head being eccentric to that of the said continuous drilling edge, so that said lateral cutting edges lie wholly within the outline of the head and its crown portion and said drilling edge projects beyond said cutting edges at the crown portion of the head and axially of the drill.

In testimony whereof I have hereunto set my hand this 28th day of January, A. D. 1930.

RUDOLF FUNKE.